(12) United States Patent
Martin et al.

(10) Patent No.: US 8,109,287 B2
(45) Date of Patent: *Feb. 7, 2012

(54) CONTROLLED RELEASE OF ADDITIVES IN FLUID SYSTEMS (75) Inventors: Harold R. Martin, Cookeville, TN (US); Dennis Kelly, Chicago, IL (US); Joseph C. Drozd, Park Ridge, IL (US); Thomas J. Blakemore, Flossmoor, IL (US); Doug Hudgens, Cookeville, TN (US); Barry M. Verdegan, Stoughton, WI (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 65 days.

This patent is subject to a terminal disclaimer.

(21) Appl. No.: 12/507,598

(22) Filed: Jul. 22, 2009

(65) Prior Publication Data
US 2009/0283466 A1 Nov. 19, 2009

Related U.S. Application Data (62) Division of application No. 10/487,327, filed as application No. PCT/US2002/026236 on Aug. 16, 2002, now Pat. No. 7,591,279.

(60) Provisional application No. 60/314,764, filed on Aug. 24, 2001, provisional application No. 60/314,960, filed on Aug. 24, 2001.

(51) Int. Cl.
*B01D 29/88* (2006.01)

(52) U.S. Cl. ........ 137/268; 422/256; 422/264; 210/206; 210/209

(58) Field of Classification Search .................. 137/268; 422/261, 264, 265, 276, 277, 279, 282, 256; 210/209, 206
See application file for complete search history.

(56) References Cited

U.S. PATENT DOCUMENTS

| 2,280,792 A | 4/1942 | Bruson |
| 2,754,330 A | 7/1956 | Schreyer |
| 2,782,240 A | 2/1957 | Hefner et al. |
| 2,841,479 A | 7/1958 | Hefner et al. |

(Continued)

FOREIGN PATENT DOCUMENTS

EP 0 279 863 A1 8/1988

(Continued)

OTHER PUBLICATIONS

Izumi et al. "Studies on Combustion, Vibration, and Noise in High-Speed Diesel Engines Through Newly Developed Measuring Instruments." Journal for Engineering for Gas Turbines and Power, vol. 110, Jul. 1988, pp. 377-384.

(Continued)

*Primary Examiner* — Kevin Lee
(74) *Attorney, Agent, or Firm* — Hamre, Schumann, Mueller & Larson, P.C.

(57) ABSTRACT

A container (1) for releasing a chemical additive (7) in a fluid material selected from a lubricant or hydraulic fluid composition comprises a fluid material-impermeable casing (3) having a hollow interior and an additive composition (7) comprising at least one fluid material-soluble additive. The additive (7) is held within the container (1) by a least one fluid material-permeable element (11) provided at or near an opening (13) in the casing (1) and is effective to provide for release of additive(s) (7) into the fluid material. Methods of releasing additives (7) into fluid material are also provided.

4 Claims, 5 Drawing Sheets

U.S. PATENT DOCUMENTS

| | | |
|---|---|---|
| 2,928,877 A | 3/1960 | Jaul et al. |
| 2,955,028 A | 10/1960 | Bevans |
| 3,087,436 A | 4/1963 | Dettlof et al. |
| 3,172,892 A | 3/1965 | Le Suer et al. |
| 3,215,707 A | 11/1965 | Rense et al. |
| 3,231,587 A | 1/1966 | Rense et al. |
| 3,272,746 A | 9/1966 | Le Suer et al. |
| 3,275,554 A | 9/1966 | Wagenaar et al. |
| 3,336,223 A | 8/1967 | Kneeland |
| 3,361,673 A | 1/1968 | Stuart et al. |
| 3,368,972 A | 2/1968 | Otto |
| 3,413,347 A | 11/1968 | Worrel |
| 3,422,157 A | 1/1969 | Kaufman et al. |
| 3,438,757 A | 4/1969 | Honnen et al. |
| 3,440,029 A | 4/1969 | Little et al. |
| 3,454,555 A | 7/1969 | Van der Vort et al. |
| 3,454,607 A | 7/1969 | Le Suer et al. |
| 3,565,804 A | 2/1971 | Honnen et al. |
| 3,574,576 A | 4/1971 | Honnen et al. |
| 3,598,738 A | 8/1971 | Biswell |
| 3,649,229 A | 3/1972 | Otto |
| 3,671,511 A | 6/1972 | Honnen et al. |
| 3,697,574 A | 10/1972 | Piasek et al. |
| 3,715,037 A | 2/1973 | Hu et al. |
| 3,725,277 A | 4/1973 | Worrel |
| 3,726,882 A | 4/1973 | Traise et al. |
| 3,749,247 A | 7/1973 | Rohde |
| 3,755,433 A | 8/1973 | Miller et al. |
| 3,756,793 A | 9/1973 | Robinson |
| 3,790,359 A | 2/1974 | Feldman |
| 3,822,289 A | 7/1974 | Clark et al. |
| 3,849,085 A | 11/1974 | Kreuz et al. |
| 3,869,069 A * | 3/1975 | Levey et al. .................. 222/180 |
| 3,877,899 A | 4/1975 | Bundy et al. |
| 3,880,569 A | 4/1975 | Bannister et al. |
| 3,912,764 A | 10/1975 | Palmer, Jr. |
| 3,932,537 A | 1/1976 | Wetzel et al. |
| 3,954,808 A | 5/1976 | Elliott et al. |
| 3,977,992 A | 8/1976 | Hofacker |
| 3,980,569 A | 9/1976 | Pindar et al. |
| 3,999,960 A | 12/1976 | Langer, Jr. et al. |
| 4,014,794 A | 3/1977 | Lewis |
| 4,026,809 A | 5/1977 | Lachowicz et al. |
| 4,032,700 A | 6/1977 | Song et al. |
| 4,061,572 A | 12/1977 | Cohen et al. |
| 4,066,559 A | 1/1978 | Rohde |
| 4,075,097 A | 2/1978 | Paul |
| 4,075,098 A | 2/1978 | Paul et al. |
| 4,110,349 A | 8/1978 | Cohen |
| 4,125,382 A | 11/1978 | O'Brien et al. |
| 4,129,421 A | 12/1978 | Webb |
| 4,137,185 A | 1/1979 | Gardiner et al. |
| 4,144,166 A | 3/1979 | DeJovine |
| 4,144,169 A | 3/1979 | Grueschow |
| 4,156,061 A | 5/1979 | Pappas et al. |
| 4,214,994 A | 7/1980 | Kitano et al. |
| 4,222,746 A | 9/1980 | Sweeney et al. |
| 4,231,759 A | 11/1980 | Udelhofen et al. |
| 4,234,435 A | 11/1980 | Meinhardt et al. |
| 4,238,628 A | 12/1980 | Cahill et al. |
| 4,247,301 A | 1/1981 | Honnen |
| 4,261,704 A | 4/1981 | Langdon |
| 4,265,748 A | 5/1981 | Villani et al. |
| 4,294,586 A | 10/1981 | Cox, Jr. |
| 4,320,019 A | 3/1982 | Hayashi |
| 4,323,714 A | 4/1982 | Malloy et al. |
| 4,326,972 A | 4/1982 | Chamberlin, III |
| 4,357,250 A | 11/1982 | Hayashi |
| 4,365,973 A | 12/1982 | Irish |
| 4,379,065 A | 4/1983 | Lange |
| 4,460,379 A | 7/1984 | Sweeney et al. |
| 4,469,908 A | 9/1984 | Burress |
| 4,515,740 A | 5/1985 | Schuettenberg et al. |
| 4,561,981 A | 12/1985 | Characklis |
| 4,588,640 A | 5/1986 | Matlach |
| 4,639,255 A | 1/1987 | Schuettenberg et al. |
| 4,658,078 A | 4/1987 | Slaugh et al. |
| 4,659,334 A | 4/1987 | Matlach |
| 4,663,063 A | 5/1987 | Davis |
| 4,668,834 A | 5/1987 | Rim et al. |
| 4,673,527 A | 6/1987 | Goudy, Jr. et al. |
| 4,687,595 A | 8/1987 | Howes et al. |
| 4,708,809 A | 11/1987 | Davis |
| 4,717,495 A | 1/1988 | Hercamp et al. |
| 4,728,452 A | 3/1988 | Hansen |
| 4,740,321 A | 4/1988 | Davis et al. |
| 4,751,901 A | 6/1988 | Moor |
| 4,755,189 A | 7/1988 | Feldman |
| 4,756,844 A | 7/1988 | Walles et al. |
| 4,777,206 A | 10/1988 | Rittler |
| 4,849,569 A | 7/1989 | Smith, Jr. |
| 4,857,073 A | 8/1989 | Vataru et al. |
| 4,862,908 A | 9/1989 | Payer |
| 4,892,562 A | 1/1990 | Bowers et al. |
| 4,904,401 A | 2/1990 | Ripple et al. |
| 4,937,299 A | 6/1990 | Ewen et al. |
| 4,974,678 A | 12/1990 | Himes et al. |
| 4,980,075 A | 12/1990 | Dobrez et al. |
| 4,981,602 A | 1/1991 | Ripple et al. |
| 4,995,418 A * | 2/1991 | Cervola ........................ 137/268 |
| 5,019,669 A | 5/1991 | Adams et al. |
| 5,032,259 A | 7/1991 | He et al. |
| 5,042,617 A | 8/1991 | Brownawell et al. |
| 5,050,549 A | 9/1991 | Sturmon |
| 5,053,152 A | 10/1991 | Steckel |
| 5,059,217 A | 10/1991 | Arroyo et al. |
| 5,069,799 A | 12/1991 | Brownawell et al. |
| 5,071,919 A | 12/1991 | DeGonia et al. |
| 5,089,041 A | 2/1992 | Thompson et al. |
| 5,094,666 A | 3/1992 | Feldman et al. |
| 5,120,349 A | 6/1992 | Stewart et al. |
| 5,137,978 A | 8/1992 | Degonia et al. |
| 5,137,988 A | 8/1992 | Matzner et al. |
| 5,160,648 A | 11/1992 | Steckel |
| 5,186,732 A | 2/1993 | Thompson et al. |
| 5,192,335 A | 3/1993 | Cherpeck |
| 5,230,714 A | 7/1993 | Steckel |
| 5,235,936 A | 8/1993 | Kracklauer |
| 5,249,552 A | 10/1993 | Brooks |
| 5,286,823 A | 2/1994 | Rath |
| 5,296,154 A | 3/1994 | Steckel |
| 5,300,701 A | 4/1994 | Cherpeck |
| 5,314,632 A | 5/1994 | Papke et al. |
| 5,324,800 A | 6/1994 | Welborn, Jr. et al. |
| 5,327,861 A | 7/1994 | Rogalla et al. |
| 5,332,407 A | 7/1994 | Herbstman |
| 5,336,278 A | 8/1994 | Adams et al. |
| 5,337,705 A | 8/1994 | Lane |
| 5,346,965 A | 9/1994 | Dever et al. |
| 5,368,615 A | 11/1994 | Steckel |
| 5,372,942 A | 12/1994 | McGarrity et al. |
| 5,374,354 A | 12/1994 | Baehler et al. |
| 5,407,594 A | 4/1995 | Fry et al. |
| 5,408,018 A | 4/1995 | Rath |
| 5,435,912 A | 7/1995 | Baehler |
| 5,456,217 A | 10/1995 | Thunker et al. |
| 5,458,793 A | 10/1995 | Adams et al. |
| 5,478,463 A | 12/1995 | Brownawell et al. |
| 5,483,327 A | 1/1996 | Taya et al. |
| 5,496,383 A | 3/1996 | Franz et al. |
| 5,507,942 A | 4/1996 | Davis |
| 5,508,356 A | 4/1996 | Dever et al. |
| 5,527,452 A | 6/1996 | Grigoriev et al. |
| 5,552,040 A | 9/1996 | Baehler et al. |
| 5,565,106 A | 10/1996 | Sherbondy et al. |
| 5,567,845 A | 10/1996 | Franz et al. |
| 5,573,557 A | 11/1996 | Thünker et al. |
| 5,580,359 A | 12/1996 | Wright |
| 5,591,330 A | 1/1997 | Lefebvre |
| 5,620,949 A | 4/1997 | Baker et al. |
| 5,643,351 A | 7/1997 | Lew et al. |
| 5,662,799 A | 9/1997 | Hudgens et al. |
| 5,662,803 A | 9/1997 | Young |
| 5,663,457 A | 9/1997 | Kolp |
| 5,674,950 A | 10/1997 | Thaler et al. |
| 5,691,422 A | 11/1997 | Emert et al. |
| 5,695,531 A | 12/1997 | Makino et al. |

| | | |
|---|---|---|
| 5,696,060 A | 12/1997 | Baker et al. |
| 5,696,067 A | 12/1997 | Adams et al. |
| 5,711,894 A | 1/1998 | Miyake et al. |
| 5,718,258 A | 2/1998 | Lefebvre et al. |
| 5,718,836 A | 2/1998 | Nakatani et al. |
| 5,725,031 A | 3/1998 | Bilski et al. |
| 5,739,356 A | 4/1998 | Dietz et al. |
| 5,741,433 A | 4/1998 | Mitchell et al. |
| 5,752,989 A | 5/1998 | Henly et al. |
| 5,752,991 A | 5/1998 | Plavac |
| 5,756,435 A | 5/1998 | Carey et al. |
| 5,772,873 A | 6/1998 | Hudgens et al. |
| 5,777,041 A | 7/1998 | Emert et al. |
| 5,777,142 A | 7/1998 | Adams et al. |
| 5,780,554 A | 7/1998 | Emert et al. |
| 5,786,490 A | 7/1998 | Dietz et al. |
| 5,803,024 A | 9/1998 | Brown |
| 5,833,722 A | 11/1998 | Davies et al. |
| 5,840,920 A | 11/1998 | Baker |
| 5,856,524 A | 1/1999 | Dietz et al. |
| 5,880,219 A | 3/1999 | Thaler et al. |
| 5,897,770 A | 4/1999 | Hatch et al. |
| 5,919,869 A | 7/1999 | Thaler et al. |
| 5,948,248 A | 9/1999 | Brown |
| 5,962,378 A | 10/1999 | Tiffany et al. |
| 6,010,639 A | 1/2000 | Mitchell et al. |
| 6,017,369 A | 1/2000 | Ahmed |
| 6,020,500 A | 2/2000 | Baker et al. |
| 6,045,692 A | 4/2000 | Bilski et al. |
| 6,074,445 A | 6/2000 | Ahmed |
| 6,114,547 A | 9/2000 | Baker et al. |
| 6,127,321 A | 10/2000 | Emert et al. |
| 6,140,279 A | 10/2000 | Emert et al. |
| 6,140,541 A | 10/2000 | Melder et al. |
| 6,183,524 B1 | 2/2001 | Ahmed |
| 6,238,554 B1 | 5/2001 | Martin, Jr. et al. |
| RE37,369 E | 9/2001 | Hudgens et al. |
| 6,537,453 B2 | 3/2003 | Beard et al. |
| 6,827,750 B2 | 12/2004 | Drozd et al. |
| 6,835,218 B1 | 12/2004 | Drozd et al. |
| 6,843,916 B2 | 1/2005 | Burrington et al. |
| 6,860,241 B2 | 3/2005 | Martin et al. |
| 6,919,023 B2 | 7/2005 | Merritt et al. |
| 7,001,531 B2 | 2/2006 | Chen et al. |
| 7,160,451 B2 | 1/2007 | Hacker et al. |
| 7,239,072 B2 | 7/2007 | Snijkers-Hendrickx et al. |
| 2002/0014447 A1 | 2/2002 | Rohrbach et al. |
| 2002/0153505 A1 | 10/2002 | Blakemore et al. |
| 2003/0053927 A1 | 3/2003 | Drozd et al. |
| 2004/0091654 A1 | 5/2004 | Kelly et al. |

FOREIGN PATENT DOCUMENTS

| | | |
|---|---|---|
| EP | 0 258 426 B1 | 7/1990 |
| EP | 0 254 776 B1 | 3/1991 |
| EP | 0 448 365 A1 | 9/1991 |
| EP | 0 476 485 A1 | 3/1992 |
| EP | 0 915 730 B1 | 5/1999 |
| EP | 1 061 251 A2 | 6/1999 |
| WO | WO 92/12221 A1 | 7/1992 |
| WO | WO 92/14806 A1 | 9/1992 |
| WO | WO 94/24237 A1 | 10/1994 |

OTHER PUBLICATIONS

Barnes et al. "A review of zinc dialkyldithiophosphates (ZDDPS) characterization and role in lubricating oil." Tribology International, vol. 34, 2001, pp. 389-395.

* cited by examiner

CONTROLLED RELEASE OF ADDITIVES IN FLUID SYSTEMS

RELATED APPLICATION

This application claims the benefit of U.S. Provisional Patent Application Ser. Nos. 60/314,960 and 60/314,764, each filed Aug. 24, 2001, the disclosure of each of which is incorporated herein in its entirety by reference.

FIELD OF THE INVENTION

The present invention relates to devices and methods for providing supplemental chemical additives to fluid material systems selected from lubricant systems, for example, but not limited to, such systems in internal combustion engines, such as those in automobiles, trucks, heavy equipment, and the like, and hydraulic fluid systems, for example, automobiles, elevators, farm and earth-moving machinery, and the like.

BACKGROUND OF THE INVENTION

Internal combustion engines are still the predominant means for propelling motorized vehicles. They are proven to offer many advantages over alternative mechanisms, among these being cost and convenience. Such engines require lubrication, usually employing a circulating lubricant. In order to achieve good performance, lubricants often include one or more additives which can become depleted and/or insufficient after a period of use. It is desirable to add lubricant additives, such as viscosity index improvers and antioxidants, and the like, to the lubricant to maintain and/or enhance the quality of the lubricant.

Hydraulic fluids are of great value in systems which provide useful mechanical advantages. These hydraulic fluids are employed in such systems often for very long times, for example, in terms of years. Additives which are initially present in the fluid can become depleted and/or insufficient, for example, during long term fluid use. It would be advantageous to provide for adding additives to such hydraulic fluids, in particular while the fluids are in use.

Various methods of introducing additives to vehicle fluid systems, generally, have been proposed. Rohde U.S. Pat. No. 3,749,247 describes a container for releasing an oxidation inhibitor into hydrocarbon-based fluid material in a working engine. The oxidation inhibitor is held in a polyolefin container that permits the additive to permeate through the container wall into the lubricant. A further approach is described by Lefebvre U.S. Pat. No. 5,591,330, which discloses a hydrocarbon oil filter wherein oxidation additives in a thermoplastic material are mounted in a casing between a particle filtering material and a felt pad. Reportedly, the thermoplastic material dissolves in the presence of high temperature oil thereby releasing the additives.

The above-described devices suffer from a variety of limitations. It is an object of the present invention to provide an alternative, relatively low-cost device for releasing chemical additives into a fluid system at a constant rate, which requires minimal human intervention.

SUMMARY OF THE INVENTION

New apparatus and methods for providing release, preferably controlled and/or sustained release, of at least one additive into a fluid material selected from, a liquid lubricant composition and a hydraulic fluid composition have been discovered. The present apparatus and methods effectively provide for sustained, preferably substantially controlled, release of a chemical additive from the apparatus into such a fluid material. The chemical additive (e.g. fluid material additive) may be of any type, for example, a lubricant additive soluble in a lubricant or a hydraulic fluid additive soluble in a hydraulic fluid.

The present apparatus and methods provide straightforward approaches to releasing the additive into a fluid material or fluid material system selected from a liquid lubricant composition or lubricant system or into a hydraulic fluid composition or hydraulic fluid system. Many components of the present apparatus, other than the additive or additives, are substantially insoluble in the fluid material so that these components remain intact and do not dissolve into and/or otherwise detrimentally affect the fluid material or fluid material system. In addition, several of the components of the present apparatus car be reused after the additive has been spent, that is substantially completely released into the fluid material. The present apparatus is easy and straightforward to manufacture cost effectively and can be used in such fluid material systems with little or no modification.

One broad aspect, of the present invention is directed to fluid material additive containers for use in lubricant systems, for example, without limitation, associated with vehicles, airplanes, generator sets, mining equipment, and the like and hydraulic fluid systems, for example, without limitation, vehicle hydraulic systems, elevators, farm machinery and the like, which are designed to provide sustained or gradual, preferably substantially controlled, release of at least one additive(s) into a fluid material as defined herein. The present containers comprise a fluid material-impermeable casing defining a substantially hollow interior and at least one opening. A fluid material additive composition selected from a lubricant additive composition and a hydraulic fluid additive composition, comprising at least one chemical additive soluble in fluid material, for example, at least one fluid material-soluble supplemental additive, is provided in the interior of the casing. The fluid material additive may be provided in the form of a liquid, gel, paste, or in solid form. In one particularly useful embodiment of the invention, the fluid material additive composition is provided as a plurality of particles, or in particulate form, for example, in the form of beads, tablets, pellets, grains or other particulate form.

The casing and other fluid material-impermeable components of the apparatus of the present invention are preferably composed of materials selected from suitable metals, fluid material-insoluble polymeric materials, combinations thereof and mixtures thereof. Useful casings can be made of materials selected from metals, such as steel, aluminum and the like, polyvinyl chloride, polyethylene, polypropylene, nylon, polyethylene vinyl acetate (EVA), polypropylene vinyl acetate (PVA), polyphenylene sulfide, polyphthalamide, sulfalone and the like, combinations thereof and mixtures thereof.

The containers of the present invention may also include at least one fluid material permeable element or component which is provided at or near the at least one opening of the casing. This fluid material-permeable element is effective to provide for release of a portion of a chemical additive composition, such as a fluid material additive, in the casing into a fluid material, for example, a liquid lubricant composition or hydraulic fluid composition, in contact with the casing. Such release occurs over a period of time so that a portion of the chemical additive is retained within the casing, at least after the initial release of additive occurs. The additive release obtained in accordance with the present invention preferably is a sustained or controlled additive release.

In one embodiment of the invention, the casing is substantially cylindrical in shape. The casing includes at least one opening, for example, at an end of the casing or in a side wall of the casing, where fluid material is allowed to contact a portion of the lubricant additive composition or hydraulic fluid additive composition contained within the casing. For example, an end cap can be employed which cradles or attaches to the open end and retains the lubricant additive composition or hydraulic fluid additive composition within the casing. In one embodiment of the invention, the cylindrical shaped casing includes two open ends, each open end being covered by an end cap. The end cap preferably comprises a fluid material-impermeable material and is effective to retain the fluid material additive selected from a lubricant additive composition and a hydraulic fluid additive composition, within the casing. The end cap includes one or more inlets or openings for allowing fluid communication between fluid material located exterior to the casing and the fluid material additive within the casing to permit the release, for example, by diffusion or otherwise, of the additive into the fluid material, preferably at a substantially controlled rate.

In another embodiment, the casing is substantially bowl-shaped in form. The at least one opening may be located at any point of the casing, for example, on the top of the casing, in a side (side wall) of the casing and/or in the bottom of the casing. In one useful embodiment, particularly when the bowl-shaped casing has an open end, for example, an open top end, a cap member may be included which provides means for retaining a lubricant additive composition or hydraulic fluid additive composition within the casing interior. The cap member advantageously is made of polymeric or other substantially fluid material insoluble material and includes at least one inlet or opening, and preferably a plurality of inlets or openings, for allowing contact between the lubricant additive composition or hydraulic fluid composition and the fluid material. The cap member may be secured to an interior surface of the casing, and may be somewhat recessed therein. In one embodiment of the invention, the cap member is removably secured or removably sealed to the casing, for example, by means of an o-ring or other suitable, e.g., conventional, sealing element or assembly.

In addition, a plate member may be provided and fixed within the bowl-shaped casing. The plate member includes one or more plate inlets which substantially align with the cap member inlets. The plate member may be made of any suitable fluid material-insoluble material.

In one embodiment, the container of the present invention comprises the bowl-shaped casing having both the cap member and the plate member disposed across the container open end. A fluid material-permeable element is disposed, or sandwiched, between the cap member and the plate member.

The fluid material-permeable element(s) or component(s) may comprise any suitable fluid material-permeable structure, and all such structures are included within the scope of the present invention. In one useful embodiment, the fluid material-permeable element or component comprises a filter member or filter media, for example, a porous or semi-permeable membrane. In another useful embodiment, the fluid material-permeable element or component comprises a micro-orifice.

The porous or semi-permeable membrane of the apparatus of the invention may be made of any suitable material that permits the desired, preferably sustained, release of chemical additive into the fluid material, particularly when the casing is in contact with fluid material. The membrane can be made of a fluid material-insoluble material, for instance, having irregularly-sized channels or discrete-sized pores therein. As used herein, a "porous" membrane refers generally to membranes having pores in a substantially discrete size range, such as a wire screen or filter paper. As used herein, a "semi permeable" membrane refers to a continuous medium, which does not have pores in a discrete size range, but instead preferably permits diffusion of molecules through narrow channels, the size of which can be difficult to measure.

In one embodiment, the membrane, for example, the porous or semi-permeable membrane, comprises one or more glasses and/or one or more polymeric materials. Very useful membranes can be made of materials selected from nylon, cellulose acetate, cellulosic polymers, glasses, polyester, polyurethane, polyvinyl chloride, polyethylene vinyl acetate, polypropylene vinyl acetate, natural and synthetic rubbers, and the like, combinations thereof and mixtures thereof.

Alternatively or additionally, the fluid material-permeable element(s) or component(s) can include a fluid material-soluble material, such as in the form of a dissolvable, that is, fluid material-dissolvable, seal, which dissolves, for example, dissolves gradually, in the presence of the fluid material to effect release of the additive from the casing. The dissolvable seal may comprise, for example, a fluid material-soluble polymer seal. Preferably, although not necessarily, the at least one fluid material-permeable element includes a support structure, for example, a wire screen or cloth or other fluid material-insoluble material, which may be coated with a fluid material-soluble polymer to form a suitable seal structure. Alternatively, the dissolvable seal may comprise the fluid material soluble polymer alone, without such a support structure. It is also noted that the membrane can be coated, e.g., with a polymeric material or a fluid material-insoluble polymeric material, such as a fluid material-soluble polymeric material or a fluid material-insoluble material, in order to more effectively control release of additive from the container into the fluid material.

In another broad aspect, the invention is directed to methods for releasing a chemical additive, preferably at a sustained, more preferably substantially controlled, rate into a fluid material. These additives include, but are not limited to, antioxidants, anti-wear additives, viscosity index improvers, corrosion inhibitors, demulsifiers, detergents/dispersants, lubricity agents, and the like and mixtures thereof. The present methods comprise placing a container as set forth herein in contact with a fluid material selected from a liquid lubricant composition or a hydraulic fluid composition. When the container is exposed to a fluid material, the fluid material passes through, for example, diffuses through, the fluid material-permeable element or elements and contacts a portion of the lubricant additive composition or hydraulic fluid additive composition. Release, preferably sustained, substantially controlled release, of additive or additives into the fluid material is obtained, for example, by diffusion through the fluid material-permeable element.

In one useful embodiment, the container in accordance with the present invention at least partially replaces and/or is integrated into the center tube of a filter assembly used to filter a fluid material, for example, while the fluid material is being used. Thus, the container is effective to provide additive release and as a structural member in a filter assembly.

Each and every feature described herein, and each and every combination of two or more of such features, is included within the scope of the present invention provided that the features included in such a combination are not mutually inconsistent.

Additional aspects and advantages of the present invention are set forth in the following description and claims, particu-

DETAILED DESCRIPTION OF THE INVENTION

The present invention is directed to containers for use in fluid material systems selected from lubricant systems or hydraulic fluid systems. Lubricant systems can be, but are not limited to, those in or associated with motors, engines, such as internal combustion engines, e.g., in vehicles such as automobiles, diesel-powered equipment, planes, trains, trucks and the like. Hydraulic fluid systems can be, but are not limited to, vehicle hydraulic systems, elevators, farm machinery and the like.

Such containers are effective in gradually, over a prolonged period of time, releasing, for example, under sustained conditions, one or more chemical additives into fluid material systems selected from a liquid lubricant such as a hydrocarbon-based lubricant composition (e.g. lubricating oil) or a hydraulic fluid, for example, a hydrocarbon-based hydraulic fluid composition. These additives include, but are not limited to, antioxidants, anti-wear additives, viscosity index improvers, corrosion inhibitors, demulsifiers, detergents/dispersants, lubricity agents, and the like and mixtures thereof.

Unless otherwise expressly noted to the contrary, each of the words "include", "includes", "included" and "Including" and abbreviation "e.g." as used herein in referring to one or more things or actions means that the reference is not limited to the one or more things or actions specifically referred to.

The present containers comprise a casing, for example, a fluid material-insoluble and fluid material-impermeable casing, having or defining a substantially hollow interior. The casing has at least one opening. The casing may have any suitable shape and size, which are often chosen to be compatible with the particular application involved. The casing, for example, may have a generally cylindrical shape, a generally bowl shape or any of a large number of other shapes. The casing may have one or more curved and/or planar walls or it can have all curved or planar walls.

The at least one opening in the casing may be provided at any location or locations in the casing. For example, such opening or openings can be located at the top and/or bottom and/or ends and/or side or sides of the casing, as desired. The choice of the location for the opening or openings often is at least partially based on the particular application involved, and/or the ease and/or the cost of manufacturing the present additive containers and the like factors and may have at least some effect on the performance effectiveness of the containers.

In order to illustrate and describe the invention more clearly, cylindrically shaped casings and bowl-shaped casings are emphasized herein. However, the present invention is not limited thereto and is applicable to casings of other shapes. Containers including such other shaped casings are included within the scope of the present invention.

In one embodiment, the casing may be cylindrical in shape, for example, having a first end and a second end. The casing is provided with at least one opening, for example at one or both of the first end and second end and/or in the side wall of the casing. The casing may be substantially bowl-shaped. For example, the bowl-shaped casing defines a hollow interior, a top, bottom and one or more side walls. The opening or openings can be located in the top, bottom and/or one or more side walls.

A fluid material additive composition, which comprises at least one fluid material-soluble additive, may be provided in the hollow interior of the casing. At least one fluid material-permeable element is provided at or near at least one opening of the casing. For example, a fluid material-permeable element advantageously is provided at or near each opening of the casing. Such fluid material-permeable element or elements are effective to provide for release of a portion of the fluid material additive composition into the fluid material composition in contact with the casing, for example, in a sustained manner over time while retaining a balance of additive within the casing.

The casing of the container may be made of any suitable material or materials of construction. The casing as such has substantially no detrimental effect on the additive composition or the fluid material composition or on the performance of the present container. The casing preferably is composed of a material selected from metals, such as steel, aluminum, metal alloys and the like, polymeric materials, combinations thereof and mixtures thereof. In one particularly useful embodiment, the casing is selected from metals, polyvinyl chloride (PVC), polyethylene (high density and/or low density), polypropylene (PP), nylon, polyethylene vinylacetate (EVA) polypropylene vinylacetate (PVA), polyester, acetal, polyphenylene sulfide (PPS), and the like, combinations thereof and mixtures thereof.

In one embodiment, the at least one fluid material-permeable element or component of a present container, preferably comprising at least one fluid material-permeable membrane, such as a porous or semipermeable membrane, facilitates or permits contact of fluid material with the fluid material additive provided within the casing. The membrane may optionally be accompanied, when desired, by at least one membrane retention member or two or more retention members, for example, an open mesh screen, woven cloth and the like, effective in retaining the membrane in a substantially fixed position relative to, for example, within, the casing.

The fluid material-permeable membrane of the invention is advantageously composed of a suitable fluid material-insoluble material, preferably selected from polymeric materials, glasses, metals, combinations thereof and mixtures thereof. For example, suitable materials include, but are not limited to, glasses, nylon, cellulose acetate, polyester, polyethylene vinylacetate (EVA), polypropylene vinylacetate (PVA), polyvinyl chloride (PVC), cellulosic polymers, polyurethane, stainless steel mesh, sintered metal (such as sintered metal discs and the like), metal membrane filters (such as silver membrane filters and the like) and the like, as well as combinations thereof and mixtures thereof. The membrane can alternatively be a material through which a fluid material additive can pass, for example, by diffusion (although not necessarily through pores), such as silicone rubber, polyethylene, polyvinylacetate, natural and synthetic rubbers, and other polymers and waxes, and combinations thereof and mixtures thereof. Such membranes are of ten referred to as semi-permeable membranes. In one embodiment, a "semi-permeable membrane" refers to a continuous film of a polymeric material permeable to fluid material, which permits diffusion of molecules through microscopic channels. The pore size of such a semi-permeable membrane is not easily measured and is typically less than about 0.2 microns.

The fluid material-permeable membrane of the present invention preferably comprises a porous membrane, advantageously a microporous membrane, such as those membranes having a pore size within the range of about 0.2 microns to about 100 microns, more preferably between about 5 and about 20 microns, for example, about 10 microns. As referred to herein, a "membrane" may be a single layer or may include multiple plies. The thickness of the membrane is preferably in a range of about 0.1 mm to about 0.5 mm or about 1 mm or about 5 mm, although other thicknesses can be effectively employed. Examples of membrane materials include metal wire meshes; polymer, such as nylon and the like, meshes; filter media; combinations thereof and mixtures thereof and the like. Particularly useful membrane materials include materials useful as filter media, for example, in fluid material filters. Examples of such materials include the filter medium sold by Fleetguard-Nelson under the trademark STRATOPORE and filter media available from Whatman and Millipore.

The fluid material permeable membrane of the present apparatus comprises a suitable fluid material-insoluble material, which can be a nylon, cellulose acetate, polyester, polyolefin, polyethylene vinyl acetate (EVA), polypropylene vinyl acetate (PVA), and the like, as well as combinations and mixtures thereof. In the event, that a selected material is insufficiently rigid under the repeated hot-cold cycling of a fluid material system, a more thermoresistant material, such as one made of ceramic, glass and the like, combinations thereof and mixtures thereof, can be employed.

As noted above, in one embodiment, the fluid material-permeable element further comprises at least one retention member. For example, the membrane may be retained across the opening of the casing by one or more wire or mesh screens, for example, stainless steel mesh screens. More particularly, the membrane may be sandwiched between at least two retention members. The retention members preferably are structured, for examples so as to have a mesh size to facilitate or permit chemical additive from the casing to be passed, for example, by diffusion, into the fluid material in contact with the container. For instance, the retainer member or members preferably have a mesh size in the range of about 10 to about 300 microns or about 500 microns or more. A particularly preferred retention member is metal, e.g., stainless steel screening and/or woven cloth.

One or more components of the fluid material-permeable member, may be at least partially soluble in a lubricant composition or hydraulic fluid composition, for example, hydrocarbon-based lubricants or hydrocarbon-based hydraulic fluids, in contact with the container. For example, the fluid material-permeable element may include an at least partially fluid material-dissolvable seal or sealing element, for example, a wax (paraffin) seal. The sealing element(s) can be applied to an assembled membrane(s) and/or retention member(s) to form a sealed container, which can be effectively shipped and/or stored without the additive composition leaking from the casing and/or being exposed to the atmosphere. In the event a fluid material additive composition is included in the casing, the seal(s) preferably are chosen so as not to be soluble in the liquid additive composition, for example, at or about ambient temperatures. This "additive-insoluble" seal feature substantially reduces or even eliminates the risk that the liquid additive composition will leak from the casing during shipment or storage. The seal(s) dissolve after the container or casing is exposed to fluid material, for example, at elevated temperatures, thereby allowing the release of the chemical additive from the casing.

In a very useful embodiment, the sealing element or assembly is structured to delay the release of the fluid material additive composition from the casing, even after the casting is placed in contact with the fluid material. For example, the fluid material may not require the additive or additives from the casing for a substantial period of time, particularly if a new fluid material including a full complement of fresh additive is used in the fluid material system. Thus, it may be advantageous to delay the release of the additive from the casing for a prolonged period of time.

In one embodiment, the sealing element includes a material which is resistant to dissolving in the fluid material, for example, so that only after prolonged exposure to the fluid material is the seal compromised and additives from the casing released into the fluid material. In a very useful embodiment, the material or materials used in the sealing element or assembly are selected to provide the desired degree or extent of delay in initiating release of the fluid material additive composition into the fluid material. Such selection can be easily determined, for example, by measuring the solubilities of various sealing materials in the fluid material in question at the normal operating temperature and conditions of the specific application involved. Of course, the seal element or assembly can be structured so that the additive or additives from the casing are released into the fluid material substantially immediately after the casing is contacted with the fluid material.

In one particularly advantageous embodiment, the sealing element or assembly includes a support structure, for example, a porous material, such as a wire screen, a woven cloth material and the like, coated, impregnated or otherwise associated with a fluid material-soluble polymer or seal member, for example, wax polymer and the like. For example, a preferred seal comprises such a wire screen or woven cloth support that has been impregnated or coated or otherwise associated with a fluid material-soluble polymer, for example, a fluid material-soluble wax, polymer and the like, which is then allowed to cool and harden. Such a fluid material soluble polymeric sealing material, for example, polyisobutylene wax, can be used as a sealing element without the support structure. In one embodiment, the support structure of the sealing element is a retention member for the membrane of the fluid material-permeable element. The use of such a support structure/retention member is effective to facilitate sealing the container, for shipment and storage, and retaining the membrane in place during release of the additive from the casing.

In one particularly advantageous embodiment, the sealing element comprises a porous or microporous material, for example, a wire screen or a woven cloth material, coated or impregnated with a fluid material soluble polymer. For example, a preferred seal comprises such a wire screen or woven cloth that has been impregnated with wax (insoluble) or polyvinyl alcohol, polyethylene oxide, including but not limited to polyethylene glycol (soluble), and allowed to cool and harden.

Any suitable material or combinations of materials may be employed in the present at least partially fluid material dissolvable seals, provided that such material or materials have no undue detrimental effect on the chemical additives, fluid materials or the performance of the present containers. For example, the present seals may be selected from natural and/or synthetic waxes having a softening temperature of at least about 140° F. and which are soluble in the fluid material to be treated. Representative materials from which the seals can be made include, without limitation, polyethylene waxes, polypropylene waxes, and polyisobutylene waxes, and the like and mixtures thereof. Such materials do not harm fluid material quality and may actually enhance the fluid material, for example, enhancement of lubricity in the case of a lubricant.

The fluid material additive composition provided within a container of the invention comprises at least one chemical additive effective when released into the fluid material to confer or maintain one or more benefits or beneficial properties to the fluid material and/or the fluid material system in which the fluid material is used. The additive composition may be provided in the form of a liquid, gel, paste or solid particles, for example, beads, tablets, pellets or grains, and the like, as well as mixtures thereof, within the casing.

A fluid material additive composition of the invention can advantageously further comprise a coating material that at least partially surrounds or encapsulates or coats the chemical additive, as discussed elsewhere herein. Such coating material may be provided in order to at least assist in controlling, or to control, the release of chemical additive from the casing, as desired. The coating material may be either fluid material-soluble or fluid material insoluble. The coating on the chemical additive should be such as to allow or permit at least some release of the additives from the casing into the fluid material composition.

The fluid material additive components of the present invention may be located in a matrix material, for example, a fluid material-insoluble matrix material, such as a fluid material insoluble polymeric material. The matrix material, if any, should be such as to allow or permit release of the additive component from the casing into the fluid material. The matrix material advantageously is effective to at least assist in controlling, or to control, the release of the additive component into the fluid material. In one embodiment, the additive component is present in the casing and no matrix material is employed.

In one embodiment, as discussed herein, the fluid material-permeable element or elements include a polymer-containing membrane, for example, a polymer-coated membrane, in order to achieve enhanced additive release control. In this latter aspect, the membrane, that is the membrane of the fluid material-permeable element or elements, is suitably coated, impregnated or otherwise associated, for example, by spray coating, dip coating and the like, with a polymer material. Suitable polymer materials include without limitation, fluid material insoluble materials which have no significant detrimental effect on the fluid material being treated, on the additive components in the casing or on the performance of the present container. Examples of such coating materials include those listed by Mitchell et al U.S. Pat. No. 6,010,639, the disclosure of which is incorporated in its entirety herein by reference. A particularly preferred polymer material is polyethylene vinyl acetate copolymer. In addition, or alternatively, the present retention member(s) of the fluid material-permeable element or elements can be coated, impregnated, or otherwise associated with a material, for example, a fluid material-insoluble polymer material, such as those disclosed in Mitchell et al U.S. Pat. No. 6,010,639, to at least assist in controlling or to control, release of the additive composition from the casing, as desired.

The container of the present invention preferably is filled with one or more fluid material additives through the opening or openings of the casing or otherwise.

The containers of the invention, for example, the casings of the containers, may include one or more fluid material-impermeable cap members or fluid material-impermeable plugs, which can be detachable or removable from the casing or the remainder of the casing, for example, to facilitate filling the interior space of the casing with additive composition.

In one embodiment of the present invention wherein the casing is substantially cylindrical shaped and the opening or openings are located at the end or ends of the casing, one or both ends of the casing may include a cap member, with at least one of the cap members being removable to allow the casing or cartridge to be filled or refilled with fluid material additive composition. Another open end of the casing, if desired, may include a cap member that is permanently sealed thereto, for example, during manufacture, for example, during injection molding of the container. Whenever the cap or plug is attached by threading or screwing it onto the casing, screw threads can be applied to the respective pieces during or after molding with suitable dies or within the mold. The cap member can alternatively be applied to the casing by a press fit. In this case, suitable tolerances to make a snap fit between the casing and the end piece can be provided, for example, to the plastic injection molds used to make the respective pieces. The end piece can also be formed integrally with the casing, e.g., during injection molding.

The cap or end piece used to close at least one end of the casing containing the chemical additive typically is provided with at least one opening to permit release of chemical additive therethrough, and to provide fluid communication between the fluid material located exterior to the container and the fluid material additive composition disposed within the casing interior. Whenever an end piece is formed integrally with the casing, the opening can be provided therein during or after formation of the casing, for example, by injection molding.

It will be appreciated by those of skill in the art that release of additive composition into a fluid material system utilizing a container of the present invention is provided, and the release rate may be substantially controlled by consideration of several factors. The following factors, as well as others, may also have an effect on the performance and effectiveness of the containers of the present invention. For example, a desired fluid material additive release rate may be obtained by appropriate selection of: the number and type membrane layers; membrane composition; membrane pore size, if any; the presence, type and amount, if any, of polymer associated with, e.g., coated, on the support member or membrane and/or retention member; and the presence, type and amount, if any, of the coating on the additive composition. The rate of release may also be influenced by the number and size of openings in the casing and the like.

Other factors to be considered include, among others, the type and form of chemical additive in the fluid material additive composition, solubility of the additive, lubricant temperature, for example, the lubricant temperature, and velocity of fluid material through the fluid material line and the like factors.

Further contemplated within the invention is a method for releasing a chemical additive, preferably at a controlled rate, into a liquid fluid material composition. The method comprises placing in contact with the fluid material composition a container or cartridge as described herein containing the chemical additive component or composition. The container or cartridge configuration described herein preferably permits a release, preferably a controlled release, of additive component from the casing interior into the fluid material composition. It is contemplated that, in some configurations, fluid material composition is permitted to flow around and encircle the casing containing the chemical additive. However, even in these configurations, release of chemical additive is preferably sustained and/or controlled, for example, by passive diffusion, rather than by forced flow of fluid material composition through the casing.

A chemical additive component for use in a container or cartridge of the invention preferably is provided as a liquid, gel, paste or as particles, for example, beads, tablets, pellets, grains, coated versions of these, and the like, as well as mixtures thereof. The particles have a physical size large enough to prevent passage through the fluid material-permeable components of the invention as described elsewhere herein.

A chemical additive for use with the present invention serves some beneficial function within the fluid material and/or fluid material system. For instance, the fluid material additive composition can include, but is not limited to, one or more viscosity index improvers, antioxidants (also known as oxidation inhibitors), anti-wear agents, dispersants/detergents, lubricity agents, demulsifiers, and the like and mixtures thereof. In addition, additives can be multifunctional; that is, each additive can serve one or more particular functions.

Table 1 includes, without limitations examples of additive types, examples of classes of additive types and examples of certain chemical additives. Also included in the table are some functions of the of the additives. The additives are not limited to performing only the functions included in the table.

TABLE 1

| Additive Type | Classes of Additives | Function | Examples of Additives |
| --- | --- | --- | --- |
| Detergents | Metallic Dispersants, Overbase Additives | Disperse particulate matter in fluid, for example, oil | Sodium, barium, calcium or magnesium salts of salicylate esters, sulfonates, phosphonates, phenates, thiophosphonates, sulfophenates, alkoxides, or carboxylates |
| Dispersants | Ashless Dispersants | Inhibit formation of sludge and varnish to reduce deposit formation | Long-chain and/or high molecular-weight ashless organic molecules, such as N-substituted alkenyl succinimides, esters and polyesters; amine and polyamine salts of organic acids, Mannich bases derived from alkylated phenols, copolymers of methacrylates or acrylates containing polar groups,* ethylene-propylene copolymers containing polar groups,* or vinyl acetate-fumaric acid ester copolymers |
| Antioxidants | Oxidation Inhibitors | Prevent deterioration and oxidation of fluid, for example, oil | Zinc dialkyl or diaryl dithiophosphates; phenolic compounds; organic phosphites; metal dithiocarbamates; sulfurized olefins; hindered or aromatic amines; organo selenides; phosphorized or sulfurized terpenes |
| Corrosion Inhibitors | Rust inhibitors, Bearing Corrosion Inhibitors, Antirust Agents, Overbase Additives, Metal Passivators | Inhibit corrosion and/or rust formation | Zinc dithiophosphates; organic phosphites; metal dithiocarbamates; phosphorized or sulfurized terpenes; sulfurized olefins; aromatic nitrogen compounds; sulfonates; alkenyl succinic acids and derivatives; propoxylated or ethoxylated alkyl phenols; substituted imidazolines; barium, calcium or magnesium salts of oxides or carbonates |
| Antiwear Additives | Extreme Pressure Additives, Friction Modifiers Antiwear Agents, Extreme Pressure Agents, Oiliness Agents | Reduce wear | Zinc, calcium, magnesium, nickel, cadmium or tetralkyl ammonium salts of dithiophosphoric acid; various molybdenum sulfur compounds; organic phosphites; sulfurized olefins; various triazoles; fatty acid derivatives; dicarbamate derivatives; alkaline compounds as acid neutralizers |
| Viscosity Index Improvers | Viscosity Modifiers, Viscosity Improvers | Lower the rate of change in viscosity with temperature | High molecular-weight polymers, such as olefin copolymers (e.g., ethylene-propylene copolymers, polyisobutenes); various styrene copolymers (e.g., butadiene, isoprene, ester); or esters (e.g., acid ester copolymers. polymethacrylates) |
| Pour Point Depressants | Wax Modifiers, Cold Flow Improvers | Lower the temperature at which the fluid flows and improve filterability | Alkylated naphthalene; polymethacrylates; crosslinked alkylated phenols; vinyl acetate-fumaric acid ester copolymers; alkyl fumarate; vinyl ester copolymers; styrene-ester |

TABLE 1-continued

| Additive Type | Classes of Additives | Function | Examples of Additives |
|---|---|---|---|
| | | | copolymers; derivatized alkyl methacrylate-acrylate copolymers; olefin copolymers; alkylated polystyrene |
| Antifoamants | Anti-foam Agents | Prevent formation of stable foam in fluids | Silicones, polyethers |
| Demulsifiers | | Promote oil-water separation | |
| Emulsifiers | | Promote formation of stable water-in-oil emulsion by reducing size of dispersed water droplets | Metal salts of carboxylic acids |

*polar groups include such groups as amines, amides, imines, imides, hydroxyl, ether, etc.
References:
P. A. Asseff, "Lubrication Theory and Practice," The Lubrizol Corporation, document 183-320-59
N. Benfaremo and C. S. Liu, "Crankcase Engine Oil Additives," Lubrication 76(1): 1-12, publ. Texaco Inc. 1990.
J. Chu and R. K. Tessmann, "Additives Packages for Hydraulic Fluids," The BFPR Journal 12(2); 111-117, 1979

As used herein, the term "additive" includes any material that can be compounded or admixed with the sustained release components to impart beneficial properties to the fluid material. For example, in a preferred embodiment, an oil soluble molybdenum compound is added to lubricant to reduce friction and to act as an anti-wear agents and antioxidant (oxidation inhibitor). A preferred oil soluble molybdenum compound is molybdenum dithiocarbonate with a dialkyl ester of an aliphatic or aromatic dicarboxylic acid. Holt, et al in U.S. Pat. No. 6,172,013 describes molybdenum compounds of this type prepared with esters made from polycarboxylic esters and monohydric alcohols. The ester base oils may be employed at about 5% to about 15% wt/wt or wt/vol with the molybdenum dithiocarbonate employed at a concentration of about 500 ppm.

In another embodiment, a viscosity index improver is added to a fluid material to resist fluid material thinning. Viscosity index improvers may be used in the lubrication systems for automatic transmission fluids. Viscosity index improvers are usually polymeric materials. As disclosed in Tipton U.S. Pat. No. 6,133,210, shear-resistant polymers are lower molecular weight polymers that are used in increased amounts compared to higher molecular weight polymers. Bloch, et al in U.S. Pat. No. 5,641,732 uses/teaches viscosity index improvers including hydrocarbyl polymers and polyesters. In one embodiment, outlined in Cusano, et al U.S. Pat. No. 4,146,492, the fluid material composition contains an additive acting as a viscosity index improver comprising an ethylene-propylene copolymer. Another embodiment of a viscosity index improver comprises a polymeric carboxylic ester.

Anti-wear agents that can be used in fluid materials include, but are not limited to, those included in Table 1 and zinc dithiophosphates, dithiophosphates, dithiophosphoric acids, salts of dithiophosphoric acids, thiophosphorus acid esters and amine salts of the thiophosphorus acid ester and mixtures thereof. One embodiment of this additive comprises, as outlined in Mathur, et al in U.S. Pat. No. 5,622,923, at least one monothiophosphorus compound from the group containing the monothiophosphorus acid ester and its amine salt. The monothiophosphorus compound contains a hydrocarbyl terminated oxyalkylene or a hydrocarbyl terminated polyoxyalkylene.

Antioxidants (oxidation inhibitors) are useful in lubricant compositions and hydraulic fluid compositions. Examples of antioxidants include those disclosed in Table 1.

Dispersants/detergents are also used as additives in a fluid material. Some useful dispersants and detergents are found in Table 1.

Demulsifier additives may be useful in a fluid material. Demulsifiers include substances which promote oil-water separations. A demulsifier may includes polyoxyethylene ethers. Zinc dialkyldithiophosphate (ZDP) may be useful when utilized in combination with a demulsifier.

A device of the present invention can be placed in a fluid material filter, either upstream or downstream of the filter medium, or it can be provided in a substantially fixed position in the fluid material line, either upstream or downstream of a fluid material filter. Release of an additive into the fluid material is governed, at least in part, by pore size, membrane thickness, membrane composition, surface area of the membrane, viscosity of liquid additive, surface tension and membrane wetting ability of the additive, operating temperature, additive solubility and the like.

The invention will now be described with reference to certain examples, which illustrate but do not limit it.

EXAMPLES

Example 1

Figure 1A:
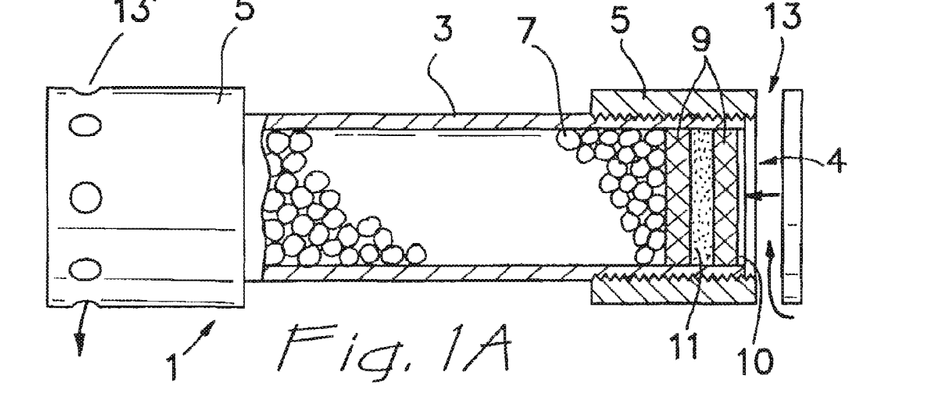
FIG. 1A is a partial cross-sectional view of a preferred cylindrical additive container wherein additive is released through both ends of the container in accordance with the present invention. In this embodiment, screw caps at either end of the container are provided with holes or openings.

Dual Release Vessel. Referring now to FIG. 1A, container 1 comprises a solid, open ended, cylindrically shaped PVC casing 3 and end caps 5 and 5', which are screwed onto the casing. The casing 3 has two open ends 4. Provided within the casing are particles 7 of a fluid material additive composition, which is retained within the casing by inner and outer screens 9 and fluid material-permeable membrane 11. Wax seal 10 is applied to outer screen 9 for shipment/storage of the container. Alternatively, or in addition, the wax seal can be applied to inner screen 9. If the seal is located on the top, the seal will come in contact with the fluid material substantially immediately and effect a faster release of the fluid material additive composition. If the seal is located on the bottom, the fluid material must first pass through the membrane in order to dissolve the wax. Such placement of the seal can be useful to delay the initial release of fluid material additive composition, if such delay is desired. The wax seal erodes/dissolves whenever the container is placed in use. End caps 5 and 5' are provided with openings 13 and 13', respectively, which permit infiltration of fluid material composition and contact with the porous membrane 11 in the casing 3. Moreover, release of fluid material additive through the membrane 11 permits its incorporation into the fluid material composition and its circulation throughout the fluid material system. The arrows in FIG. 1A show the flow of fluid material in and around the container 1.

Figure 1B:
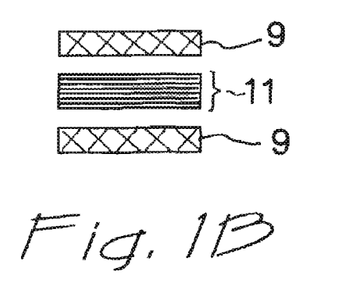
FIG. 1B is an exploded view of various components of the fluid material-permeable element used in the container shown in FIG. 1A.

FIG. 1B is an exploded view of a preferred fluid material-permeable element of the invention, which comprises mesh screens 9 on either side of fluid material-permeable membrane 11. The screens 9 are sized and effective to hold membrane 11 in position in casing 3. Fluid material-permeable member 11 is effective to allow fluid material to contact particles 7 and to permit fluid material additive to exit casing 3. The screens further assist membrane 11 to retain particles 7 within the casing 3.

For a container 1, six (6) inches in length having a 1.5 inch inner diameter, the amount of additive inside the casing is about 186 mL (173 g). Paraffin (wax) seal 10 may be applied to outer screen 9. A preferred wax has a melting point of 158° F. and dissolves in fluid material over several hours at 100° F. Release of effective amounts of additive starts in less than about 24 hours.

Example 2

Figure 2A:
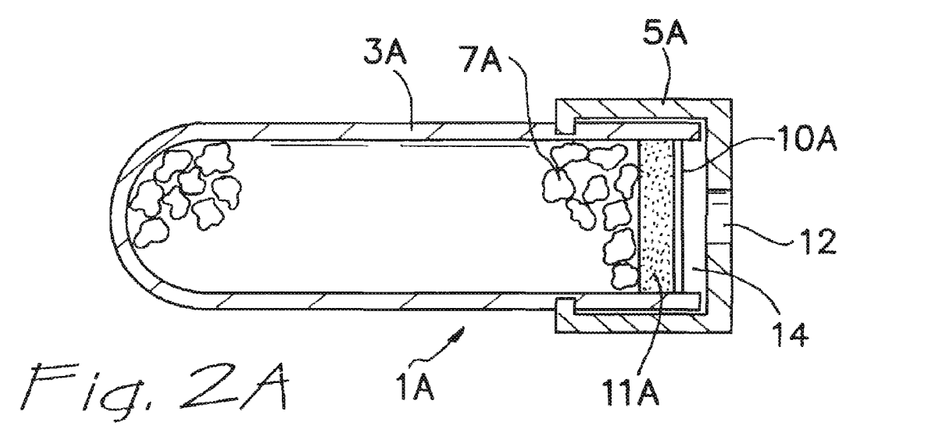
FIG. 2A is a cross-sectional view of an alternate cylindrical shaped additive container of the present invention, wherein a press-fit end cap is provided with an orifice that serves to control release of additive from the container.

Single Release Vessel. FIG. 2A depicts a cross-sectional view of an alternative embodiment of the present container, shown as 1A. In this embodiment, casing 3A is structured similarly to casing 3, but has only a single open end 14, which is capped with end cap 5A. The end cap 5A is press-fit onto casing 3A, rather than being screwed on, and is further provided with release orifice 12 that at least assists in controlling release of additive from the container 1. In this embodiment, membrane 11A is sufficiently rigid to hold it in place and retain particles 7A. Wax seal 10A is located in proximity to, preferably on, membrane 11A to seal container 1A for shipment/storage.

Figure 2B:
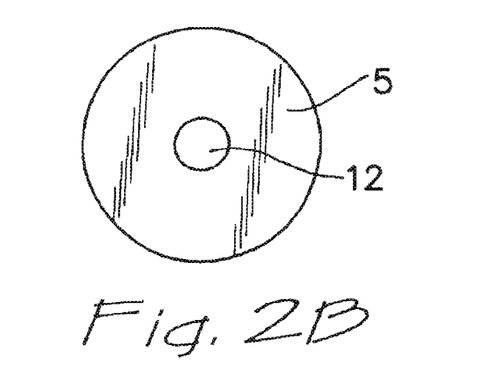
FIG. 2B is an end view of the end cap shown in FIG. 2A.

FIG. 2B shows an end view of the end cap 5A shown in FIG. 2A, clearly showing orifice 12. Container 1A is effective, when placed in contact with fluid material, to release additive composition from casing 3A into the fluid material in a sustained manner over a period of time.

Example 3

Figure 3A:
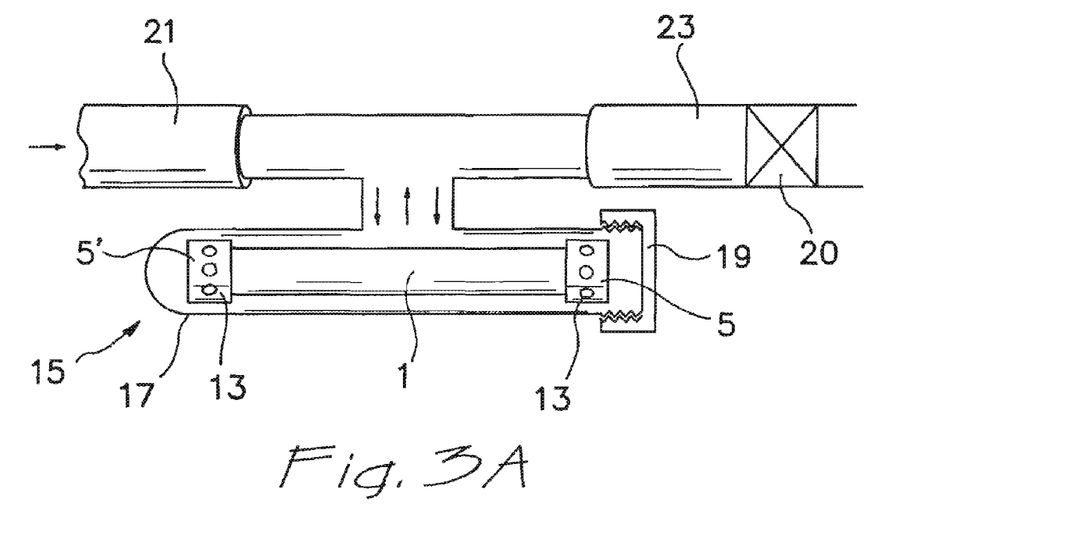
FIG. 3A is a schematic illustration showing the additive container of FIG. 1A in use in conjunction with a fluid material line.

Dual Release Configuration. FIG. 3A illustrates one aspect of the present invention in which a dual-release container 1A (as shown in FIG. 1A) is employed in a "bypass" additive release vessel. In particular, container 1A lies horizontally in housing 15 and is held therein by screw cap 19, which is secured to housing body 17. Fluid material flow from inlet line 21 enters housing 15 and exits via exit line 23. While inside the housing 15, fluid material circulates through openings 13 and 13' in end caps 5 and 5', respectively, causing the release of additive from container 1A into the fluid material. Generally, fluid material flows into the housing 15 by the action of a fluid material pump knot shown) of the fluid material system, it being understood that gravity may also play a role. In addition, a fluid material filter element 20, for example, of conventional and well known design, is located in exit or outlet line 23. It is understood that filter element 20 could alternatively be located in inlet line 21. Such alternative is included within the scope of the present invention.

Example 4

Figure 3B:
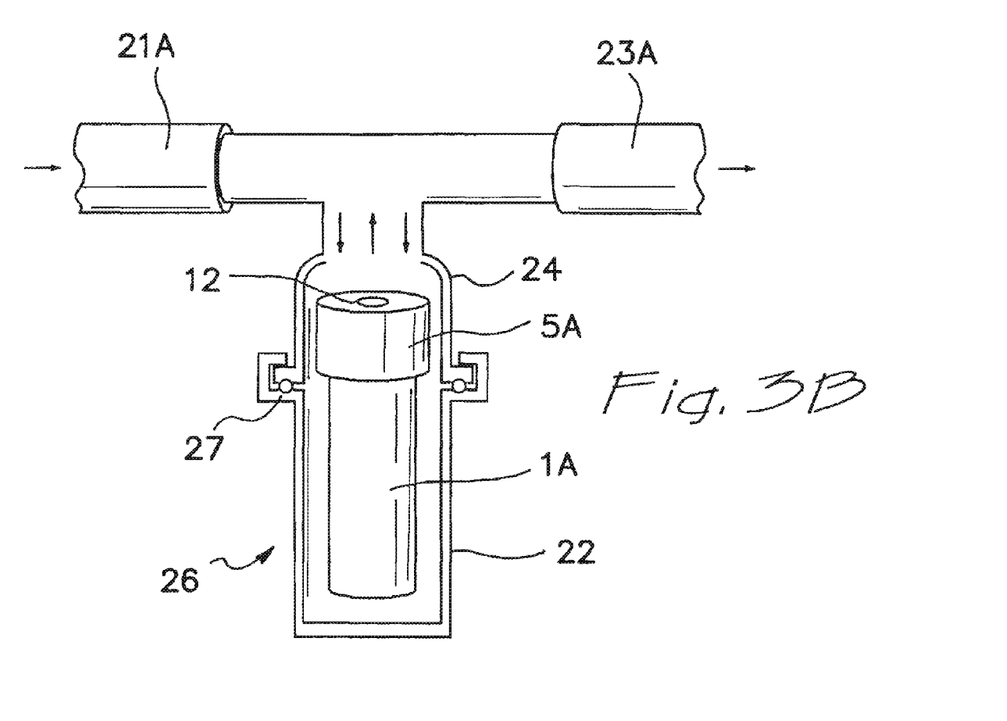
FIG. 3B is a schematic illustration showing the additive container of FIG. 2A in use in conjunction with a fluid material system.

Single Release Configuration. As shown in FIG. 3B, a further aspect of the invention has container 1A (as shown in FIG. 2A) positioned in a vertical alignment within housing 26 provided in a "bypass" configuration with the fluid material system. Representative diameter for the orifice 12 is 0.75 inch for a container 1A that is 6 inches in length and has a 1.5 inch inner diameter. As shown, housing body 22 and housing top 24 interlock to secure the container within the housing 26. A housing O-ring seal 27 is provided between housing body 22 and housing top 24 to seal the interior space of housing 26. Fluid material flow from inlet line 21A enters housing 26 and exits via exit line 23A. While inside housing 26, fluid material passes in and out of orifice 12 causing the release of additive from the container 1A into the fluid material. A fluid material pump and a fluid material filter element may be employed by this embodiment in a manner analogous to that described in Example 2.

Example 5

Bowl-Shaped Configuration

Figure 4A:
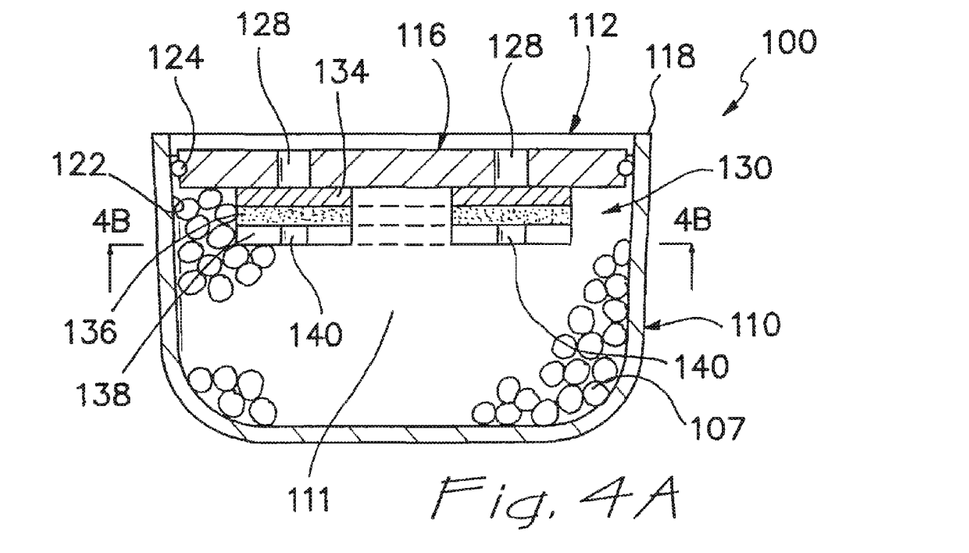
FIG. 4A is a cross-sectional view of an additional embodiment of an additive container in accordance with the present invention.
Figure 4B:
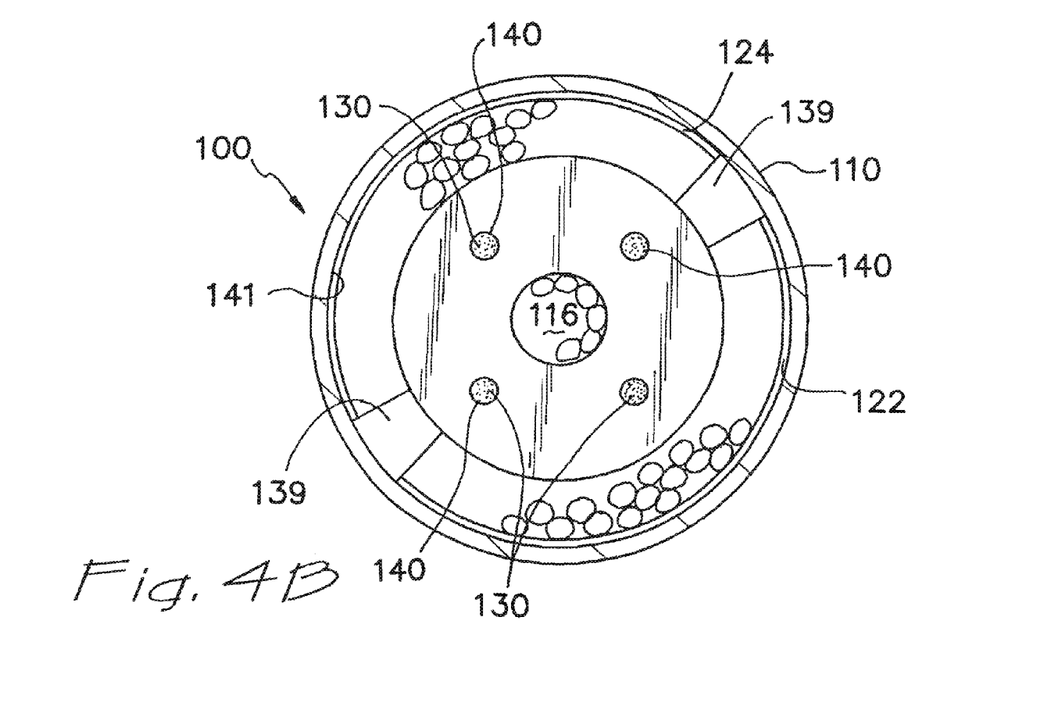
FIG. 4B is a view taken generally along the line of 4B-4B of FIG. 4A.

Turning now to FIGS. 4A and 4B, an additional container 100 of the present invention is shown. The container 100 generally comprises a bowl-shaped, fluid material-impermeable casing 110 having an interior 111 filled with a fluid material additive composition 107, and a relatively wide open top end 112 which is, for example, circular in shape. The container 100 further comprises a cap member 116 disposed across, and preferably substantially completely covering the open end 112.

The container 100 is useful in a fluid material line, for example, of an automobile engine (not shown). The container is typically placed or secured in the fluid material line, for example, in a manner analogous to that shown in FIGS. 3A and 3B.

Preferably, in the preferred container 100 shown, the cap member 116 is removably secured to the casing 110 in order to allow for filling and/or refilling of the container 100 with fluid material additive composition 7.

As shown, the cap member 116 may be recessed from a periphery, or rim 118, of the casing 110.

The cap member 116 may be secured to an interior surface 122 of the casing 110 by means of a resilient O-ring 124 or the like.

The cap member 116 includes at least one inlet 12B, preferably a plurality of inlets 128, to allow a liquid fluid material composition (not shown) flowing exterior to the container 100 to enter the casing 110 and contact the fluid material additive composition 107.

A fluid material-permeable element 130 is provided for controlling release of fluid material additive into the fluid material. More specifically, the fluid material permeable element includes a dissolvable seal layer 134, a membrane filter member layer 136 and a plate member 138 having one or more inlets 140 therethrough.

The dissolvable seal layer 134 preferably comprises a wire or mesh screen, for example a stainless steel screen, impregnated with a fluid material-soluble polymer as described elsewhere herein. The layer 136 is a layer of filter medium, as described elsewhere herein.

The plate member 138 may be made of aluminum or other material or materials that are insoluble in hydrocarbon fluid material. The plate member 138 is second in place in interior 111 using internally extending tabs 139 which are in fixed, abutting relation to the inner wall 141 of casing 110. As shown in FIG. 4A, the plate member inlets 140 generally align with the cap member inlets 128. Alternatively, the plate inlets 128 and the cap inlets 140 may be partially or entirely offset from one another. It will be appreciated that the size (and offset position if applicable) of the inlets 128, 140 will generally affect the rate of release of fluid material additive into the fluid material. In the shown embodiment, each of the seal layer 134, membrane layer 136 and plate member 138 are annular, or "donut" shaped.

As shown in FIG. 4A, the dissolvable seal layer 134 overlays the membrane layer 136, and both of these layers 134, 136 are sandwiched between the cap member 116 and the plate member 138. The seal layer 134 and the filter media layer 136 may alternatively comprise smaller, multiple elements that are sufficiently sized to at least shield the inlets 128, 140.

Container 100 functions in a manner substantially analogous to container 1A, and is effective to release additive from the container into the fluid material. A fluid material pump and a fluid material filter element may be employed in this embodiment in a manner analogous to that described in Example 2.

Example 6

Alternative Bowl-Shaped Configuration

Figure 5A:
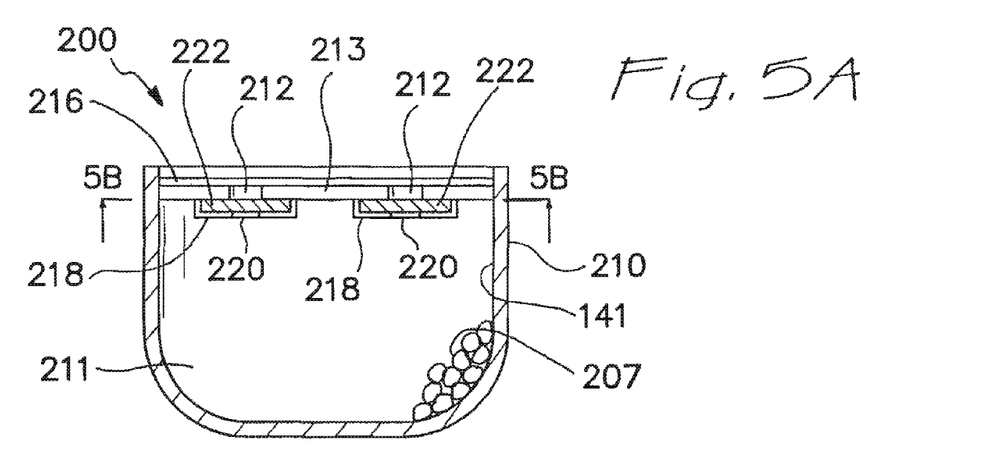
FIG. 5A is a cross-sectional view of another embodiment of an additive container in accordance with the present invention.
Figure 5B:
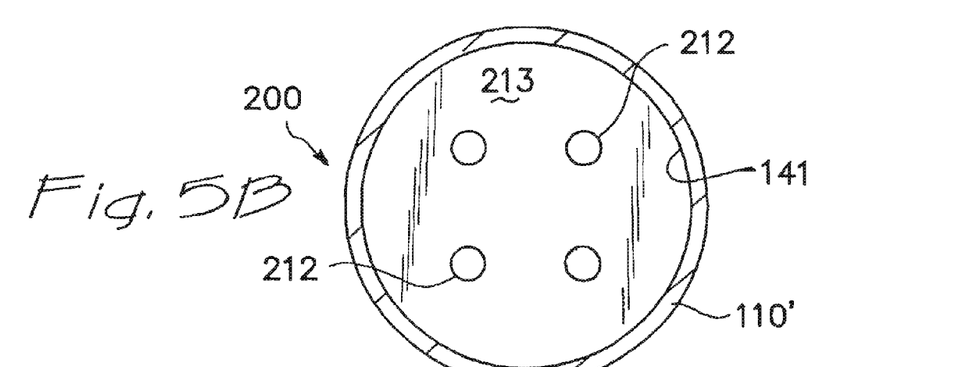
FIG. 5B is a view taken generally along the line of 5B-5B of FIG. 5A.

FIGS. 5A and 5B show still another container 200 of the present invention that is generally similar to the container 100 shown in FIGS. 4A and 4B. The container 200 generally comprises the bowl-shaped casing 210 defining a hollow interior 211 for containing fluid material additive composition 207. In addition, an aluminum plate member 213 is secured to the inner wall 241 of casing 210 for retaining the fluid material additive composition 207 within the casing 210. The aluminum plate member 213, including a plurality of inlets 212, for example, four inlets 212 as shown. Covering each of the plurality of inlets 212 is a dissolvable, fluid material-soluble polymer seal 216.

Four individual support structures 218 are secured to plate member 213 directly below each of the inlets 212. Each of these structures 218 has an opening 220 and is sized to accommodate a membrane segment 222 between the plate member 213 and the opening 220.

Container 220 can be used in a manner analogous to container 100 and functions and is effective to release additive from the interior into the fluid material. A fluid material pump and a fluid material filter element may be employed in this embodiment in a manner analogous to that described in Example 2.

Examples 7 and 8

Containers Including Differently Placed Openings

Figure 6:
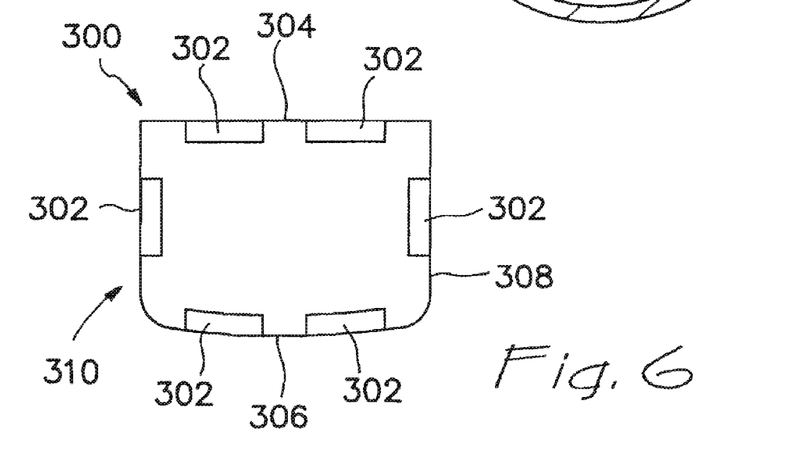
FIG. 6 is a schematic illustration of a further embodiment of a generally bowl-shaped additive container in accordance with the present invention.
Figure 7:
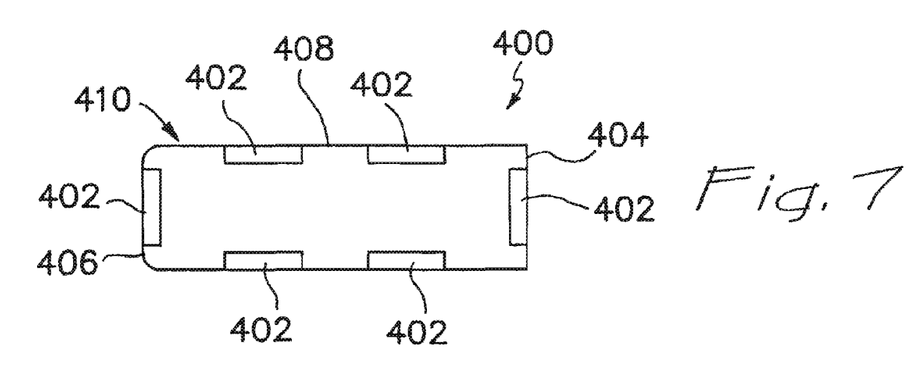
FIG. 7 is a schematic illustration of still another embodiment of a generally cylindrical shaped additive container in accordance with the present invention.

As noted elsewhere herein, containers which include openings and fluid material-permeable elements at any location or locations on the casing of the containers are included within the scope of the present invention. For example, as shown in FIG. 6, a bowl-shaped container 300 can have one or more structures which include at least one opening and a fluid material-permeable element, which structures are shown generally as 302, in the top 304 and/or bottom 306 and/or side wall 308 of the casing 310. Also, as shown in FIG. 7, a cylindrical shaped container 400 can have one or more structures which include at least one opening and a fluid material-permeable element, which structures are shown generally as 402, in the first end 404 and/or second end 406 and/or side wall 408 of the casing 410.

Each of the structures 302 and 402 include an opening in the casing 310 and 410, respectively; a seal layer, effective for shipment/storage; and a membrane layer effective in controlling the release of the additive in the casing into the fluid material. The structure or structure 302 and 402 are secured to the casings 310 and 410, respectively, using techniques analogous to those described herein to secure fluid material-permeable elements to casings. Such analogous techniques are well within the ordinary skill in the art and need not be described in detail here. Containers 300 and 400 can be used in manners analogous to those described herein with respect to containers 1, 1A, 100 and 200, and are effective to release additive from the container into the fluid material. A fluid material pump and a fluid material filter element may be employed in this embodiment in a manner analogous to that described in Example 2.

Example 9

Filer Assemblies Including Additive Containers

Figure 8:
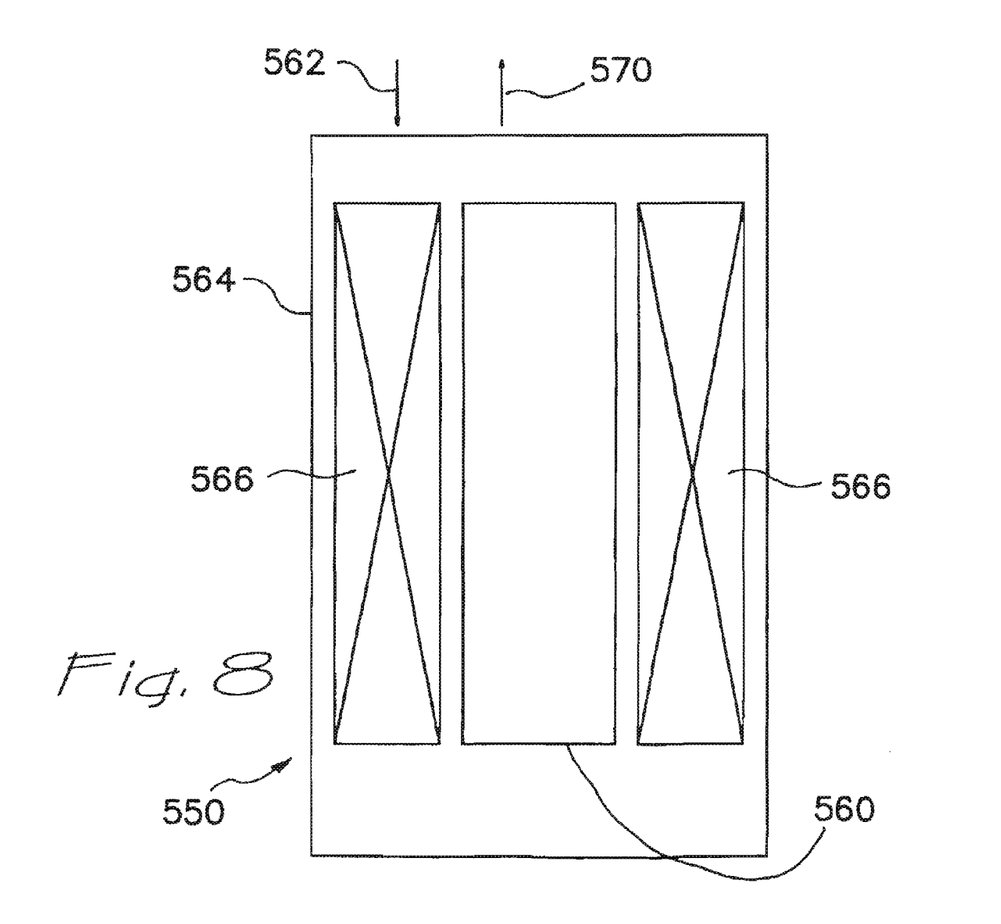
FIG. 8 is a schematic illustration of a fluid material filter assembly including an additive container.

FIG. 8 schematically illustrates a fluid material filter assembly 550 in which an additive container 560 in accordance with the present invention is employed as the center tube. The container 560 is cylindrically shaped and is configured generally analogously to many of the containers described elsewhere herein.

Fluid material from inlet line 562 passes into filter housing 564 and comes into contact with filter medium 566, of conventional structure. The filtered fluid material is then contacted with container 560 and additive from the container is released into the fluid material. The filtered, additive enriched fluid material then passes from the filter housing 554 through outlet line 570 and ready for use.

It should be noted that the filter assembly can be configured so that the fluid material contacts the additive container first, before contacting the filter medium, and such alternate configuration is within the scope of the present invention.

In any event, the additive container 550 acts and is effective both to provide for sustained release of additive and as a structural member for the filter assembly 550.

While the present invention has been described with respect of various specific examples and embodiments, it is to be understood that the invention is not limited thereto and that it can be variously practiced within the scope of the following claims.

What is claimed is:

1. A seal assembly comprising:
   a fluid material-permeable membrane sized and adapted to be positioned in or near an opening in a casing defining a hollow interior containing a fluid material additive effective to provide a benefit to and soluble in a fluid material selected from the group consisting of a liquid lubricant composition and a hydraulic fluid composition, the membrane is adapted to be positioned so that substantially all of the fluid material additive leaving the hollow interior through the opening passes through the membrane; and
   a seal member sized and adapted to be positioned relative to the opening in the casing to prevent fluid material additive leaving the hollow interior through the opening when the seal member is intact, the seal member includes a support structure and a fluid material-soluble polymer.

2. The seal assembly of claim 1 wherein the seal member is adapted to be compromised in the presence of a fluid material selected from the group consisting of a liquid lubricant composition and a hydraulic fluid composition, thereby allowing fluid material additive to leave the hollow interior through the opening.

3. The seal assembly of claim 1 wherein the support structure includes at least one of a wire screen and a woven cloth.

4. The seal assembly of claim 1 which further comprises at least one retention member sized and adapted to be positioned to be effective in retaining the membrane in a substantially fixed position relative to the casing.

\* \* \* \* \*